United States Patent [19]

Yoshikawa et al.

[11] Patent Number: 4,542,974

[45] Date of Patent: Sep. 24, 1985

[54] FLASH PHOTOGRAPHY APPARATUS

[75] Inventors: Ryoichi Yoshikawa; Kouichi Ohmori; Isao Watanabe, all of Kanagawa, Japan

[73] Assignee: Canon Kabushiki Kaisha, Tokyo, Japan

[21] Appl. No.: 625,708

[22] Filed: Jun. 28, 1984

[30] Foreign Application Priority Data

Jul. 1, 1983 [JP] Japan ............................ 58-119675
Jul. 11, 1983 [JP] Japan ............................ 58-125862

[51] Int. Cl.⁴ .............................................. G03B 15/05
[52] U.S. Cl. ................................... 354/415; 354/127.1
[58] Field of Search ................. 354/413, 415, 127.1, 354/149.1, 127.11, 127.12, 127.13, 145.1, 421, 423, 416, 417, 132, 141; 315/241 P, 129, 136, 134; 362/5

[56] References Cited

U.S. PATENT DOCUMENTS

| 4,078,240 | 3/1978 | Kaneko et al. | 354/416 |
| 4,465,353 | 8/1984 | Yoshida et al. | 354/415 |
| 4,484,807 | 11/1984 | Kataoka et al. | 354/415 |
| 4,486,690 | 12/1984 | Takematsu | 354/415 X |

Primary Examiner—William B. Perkey
Attorney, Agent, or Firm—Toren, McGeady, Stanger, Goldberg & Kiel

[57] ABSTRACT

In the disclosed flash unit, a preliminary flash for evaluating a proper exposure precedes a main flash. A flash exposure control apparatus respond to tilting of the flash's head after a preliminary flash to present a warning signal, or to renew the preliminary flash and thereby to readjust the aperture to the new exposure condition.

7 Claims, 7 Drawing Figures

FLASH PHOTOGRAPHY APPARATUS

BACKGROUND OF THE INVENTION

1. Field of the Invention

This invention relates to flash units for cameras, and more particularly to automatic electronic flash units for automatically setting a proper aperture value using the reflection of a preliminary flash.

2. Description of the Prior Art

The above-described type of flash unit disclosed, for example, in Japanese Laid-Open Patent Application No. Sho 58-102221 (U.S. patent application Ser. No. 447,508 now abandoned). In flash units of this type, a correct aperture value can be obtained by preliminary illumination prior to making the flash exposure. This makes it possible to accurately control the exposure. This is particularly advantageous with a bounce flash exposure made by vertically or horizontally tilting the flash discharge tube relative to the photo-sensor that points toward an object to be photographed. There, the preliminary flash illumination tells the photographer that for the given object distance the aperture value obtained falls within the dynamic range of exposure control.

However, when the above-described type of flash unit is used in bounce flash photography, the determination of an aperture value by preliminary illumination may be followed by tilting of the flash firing portion. Then the aperture value is no longer correct. If such tilting takes place accidentally and the photographer is unaware of it before he starts to actuate the camera release, an improper flash exposure will result.

SUMMARY OF THE INVENTION

With the foregoing in mind, an object of the present invention is to provide a flash unit constructed to respond to detection of whether or not the firing portion has been tilted after the preliminary flash has been fired and, if so, to presentt a warning indication to thereby eliminate the above-described problem.

Another object of the invention is to provide a flash unit including a component for sensing the relative angular position of the firing portion to the body. This sensing component is connected to a trigger circuit for the preliminary firing so that each time the firing portion changes its angular position, re-charging of the trigger circuit is allowed to proceed. Accordingly, the preliminary firing is renewed to insure that a proper flash exposure value can always be derived because the aperture value is always determined from the angular portion of the firing portion.

Other objects of the invention will become apparent from the following description of embodiments thereof when read in light of the drawings.

DESCRIPTION OF THE PREFERRED EMBODIMENTS

Figure 1:
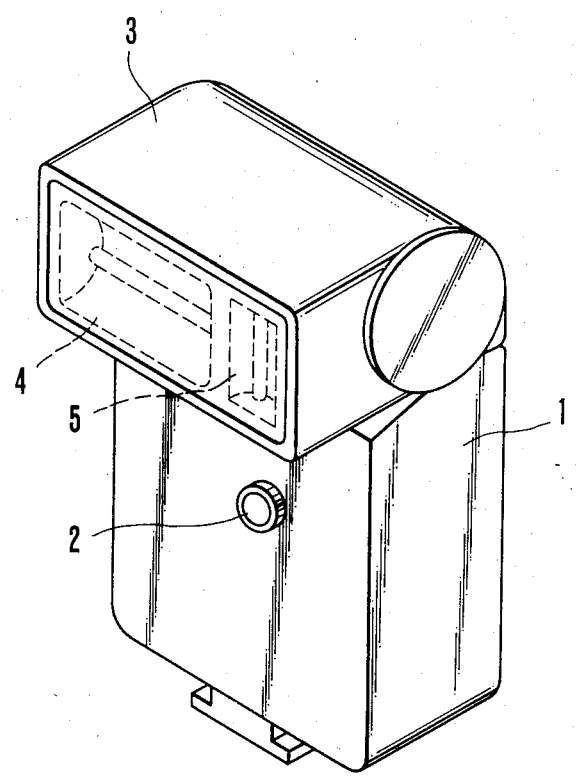
FIG. 1 is a perspective view of a flash unit according to the present invention.

FIG. 1 shows the outer appearance of the flash unit of the invention, where a body 1 has a photo-sensor 2 which points in the same direction as the objective lens of the camera when the body 1 is attached to the camera. A head portion 3 is mounted on the body, is rotatable in the vertical and horizontal directions, and has a main flash emerging window 4 and a preliminary flash emerging window 5.

Figure 2A:
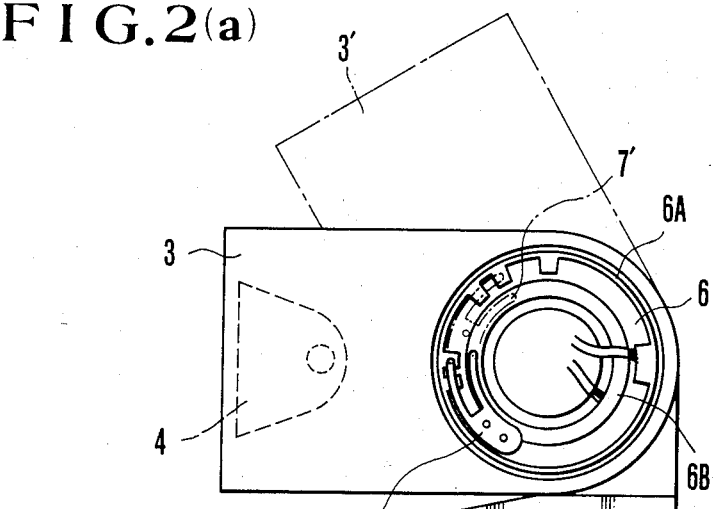
FIG. 2(a) is a side elevational view of the flash unit of FIG. 1 in different vertical bounce positions.
Figure 2B:
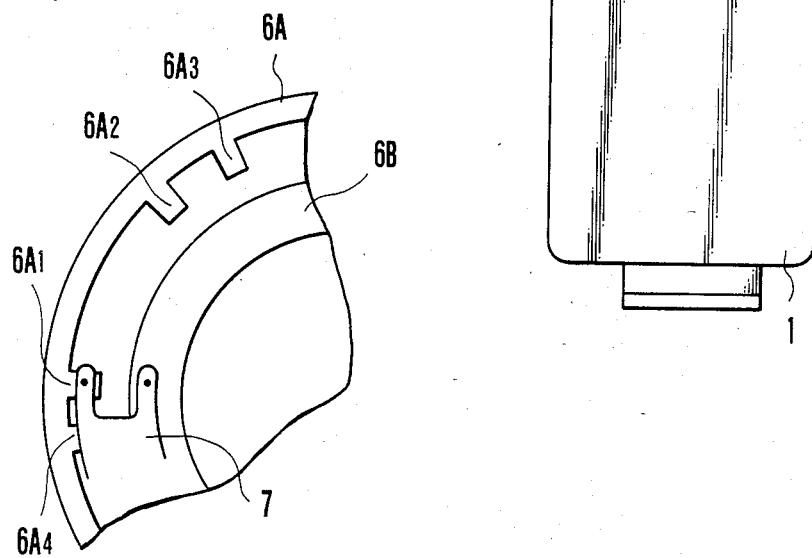
FIG. 2(b) is a fragmentary view of the main part of FIG. 2(a).

FIG. 2(a) in a side elevational section view illustrates tilting of the head 3 relative to the body 1, and FIG. 2(b) in an enlarged scale illustrates the details of a vertical angular position detector for the head 3. The detector includes a print plate 6 fixedly mounted on the housing of the body 1 having a comb-toothed electrically conductive circular pattern 6A and a common terminal 6B for the teeth 6A1 to 6A4, which form an inner concentric electrically conductive pattern. A forked brush slider 7 fixedly carried on the housing of the head 3 has its two fingers riding on the respective tracks 6A and 6B. The electrically conductive patterns and the slider constitute a switch 140a (see FIGS. 4 and 5). A tilted position of the head 3 and a shifted position of the slider 7 are indicated by dot-and-dash lines 3' and 7' respectively in FIG. 2(a). Referring to FIG. 2(b), when the head 3 is set forth in a forward pointing position illustrated by the solid line in FIG. 2(a), the slider 7 is in contact with the first comb tooth 641. The second and third teeth 6A2 and 6A3 are displaced 45° and 60° respectively from the first tooth 6A1. When the head 3 is tilted 10° downward, the fourth tooth 6A4 comes in contact with the slider 7. The head 3 is click-stopped in each of the above-described fixed tilted positions.

Figure 3A:
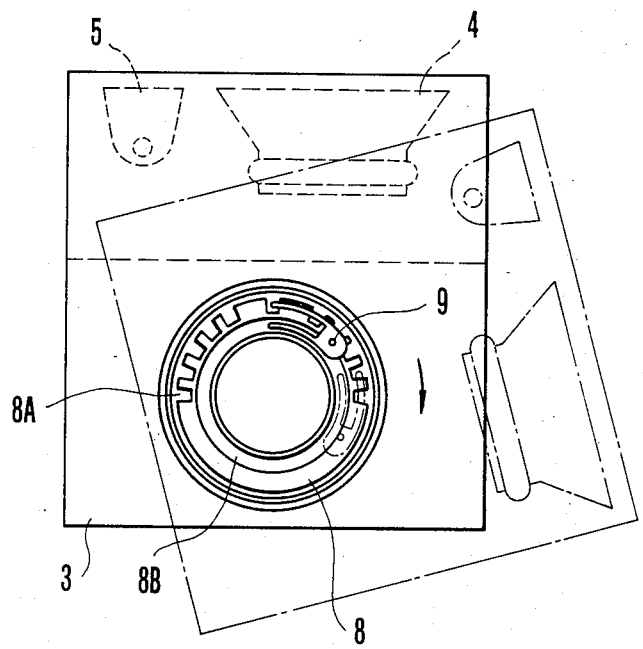
FIG. 3(a) is a top view of the flash unit of FIG. 1 in different horizontal bounce positions.
Figure 3B:
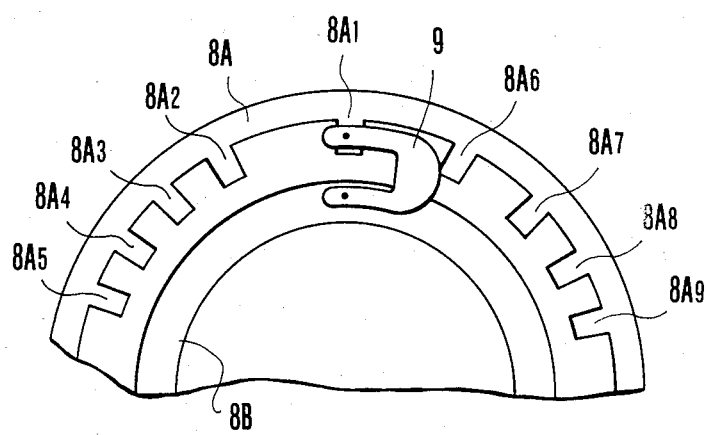
FIG. 3(b) is a fragmentary view of the main part of FIG. 3(a).

FIGS. 3(a) illustrates swinging of the head 3 with a horizontal angular position detector shown in detail in FIG. 3(b). The detector includes a plate 8 fixedly mounted on the housing of the body 1 at the surface confronting the head 3. The plate 8 has a comb-toothed electrically conductive circular pattern 8A and a common terminal 8B for the teeth 8A1 to 8A9, which form a concentric electrically conductive patter. A forked brush slider 9 fixedly carried on the housing of the head 3 slidingly moves on the patterns 8A and 8B. The patterns 8A and 8B and slider 9 constitute a switch 140b (see FIG. 4 or 5). Referring to FIG. 3(b), when the head 3 points directly to an object to be photographed, as illustrated by the solid line in FIG. 2(a), the slider 9 is in contact with the first tooth 8A1. The second to the fifth teeth 8A2 to 8A5 are displaced 30°, 45°, 55° and 65° counterclockwise from the first tooth 8A1. When the head 3 is swung 30°, 45°, 55° or 65° clockwise, as illustated in FIG. 3(b), the slider 9 comes in contact with the teeth 8A6 and 8A9 successively. A click mechanism is provided for stopping the head 3 in the above-defined angular positions.

Figure 4:
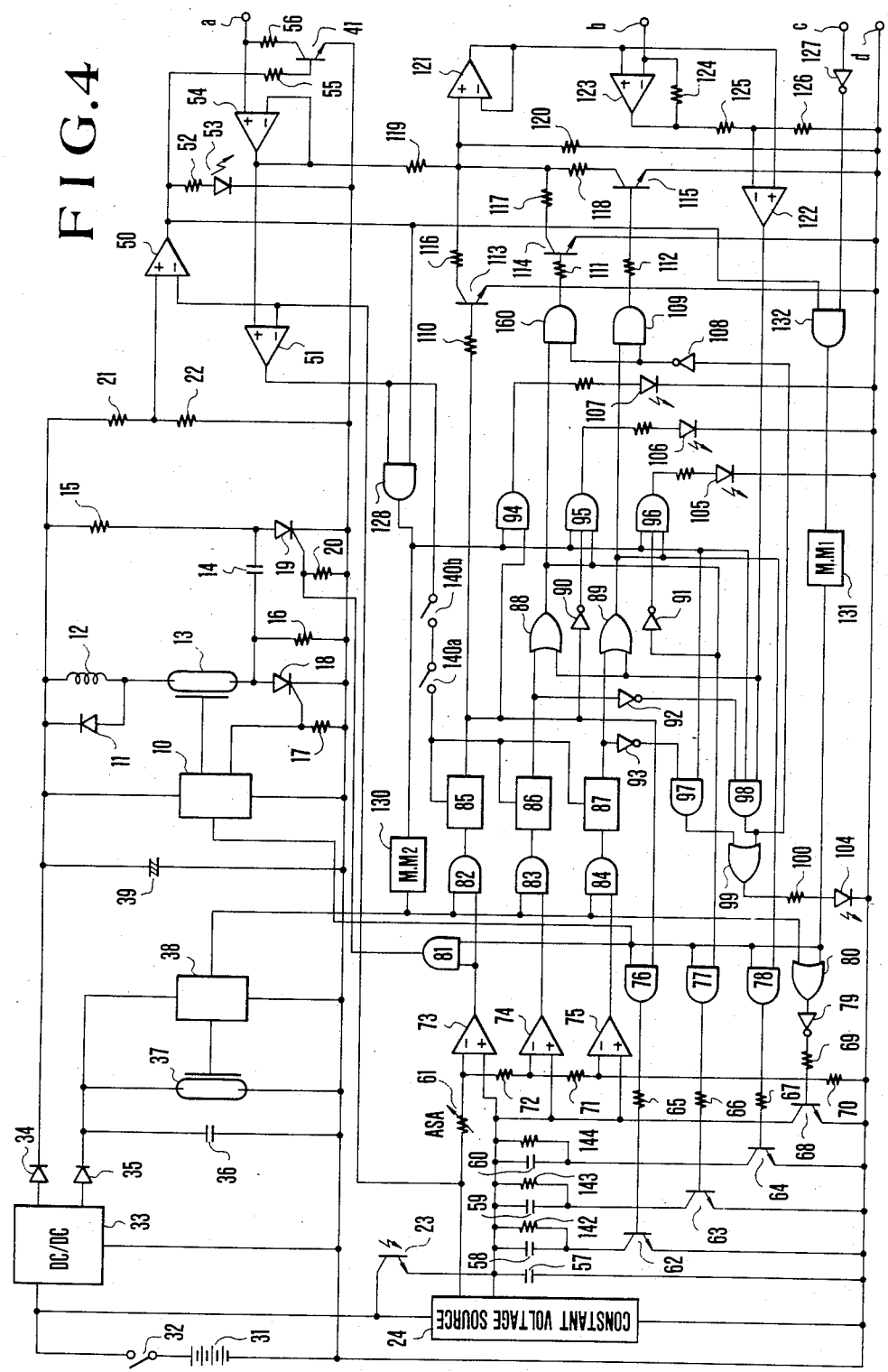
FIG. 4 is an electrical circuit diagram of an embodiment of the flash unit according to the present invention.

FIG. 4 illustrates a circuit for automatically adjusting the size of the aperture opening and automatically controlling the usable firing period in the flash photography apparatus of the invention. An electrical power source or battery 31 is connected through a normally open power supply control switch 32 to a voltage booster or DC—DC converter 33 of known construction. Two rectifier diodes 34 and 35 have their anodes connected to the output of converter 33 and their cathodes connected respectively to a main discharge tube 13 through a coil 12 and to an auxiliary discharge tube 37 for preliminary illumination. Connected across the ends of tube 37 is a storage capacitor 36 therefor. A trigger electrode of tube 37 is connected to a circuit 38 whose input is connected to the output of a monostable multivibrator 130. Connected across the main discharge tube 13 is a storage capacitor 39 therefor. Its trigger electrode is connected to a trigger circuit 10 of known construction. A second output of the trigger circuit 10 is connected to a junction of a resistor 17 and a gate of a thyristor 18 whose anode is connected to the cathode of the main tube 13.

Resistors 15 and 16 form a charging path for a communication capacitor 14. An auxiliary thyristor 19 for cutting off the main thyristor 18 has its anode connected to a junction of the resistor 15 and commutation capacitor 14 and its gate connected to a resistor 20. A voltage divider constructed of resistors 21 and 22 is connected across the main storage capacitor 39. A photo-transistor 23 position to receive the reflected light from an object to be photographed is connected between a constant voltage source 24 and a distance measuring capacitor 57. A comparator 50 has a positive input connected to the output of the voltage divider and its negative input (−) connected together with a negative input (−) of another comparator 51 to the output of the constant voltage source 24. A light-emitting diode 53 (hereinafter call LED), an indicator of the full charging of the main storage capacitor 39, is connected through a resistor 52 to the output of the first comparator 50. A buffer circuit 54 has a positive input connected to an interconnection terminal "a" arranged to contact a corresponding interconnection terminal (not shown) on the camera housing, and has an output connected to a positive input (+) of the comparator 51 for detecting when a shutter release button (not shown) is first depressed.

The output of the comparator 51 is connected through the switches 140a and 140b, which take their closed positions when the head 3 is in any of the click-stopped positions, to three latch circuits 85 to 87 at their anodes.

The output of comparator 51 is also connected to one of two inputs of an AND gate 128. An npn transistor 41 has its collector connected through a resistor 56 to the terminal "1", its base connected through a resistor 55 to the output of comparator 50 and its emitter connected to the negative terminal of the battery 31. A first timing capacitor 58 is connected at its one pole to a switching transistor 62. A second timing capacitor 59 is connected at its one pole to a switching transistor 63. A third timing capacitor 60 is connected at its one pole to a switching transistor 64. Connected across capacitors 50 to 60 are respective discharging resistors 142 to 144.

Base resistors 65 to 57 are connected to the respective transistors 62 and 64. Another npn transistor 68 has its collector connected to the opposite poles of the timing capacitors 58 to 60 so that a light metering circuit composed of the first to the third circuits 58 to 60 starts to operate at the same time when either the main or the auxiliary flash tube starts to fire. A base resistor 69 is connected to the transistor 68. Comparators 73 to 75 for selecting flash illumination levels or aperture values to use have reference voltage supply resistors 70 to 72. Variable resistor 61 has a resistance value related to the sensitivity of the used film. AND gates 76 and 78 render either one of the transistors 62 to 64 conducting in synchronism with the production of a firing trigger signal. An OR gate 80 is connected through an inverter 79 and a resistor 69 to the base of the switching transistor 68. An AND gate 81 is connected between the comparator 73 and the auxiliary thyristor 19 to apply a firing stop signal from the comparator 73 to the base of the auxiliary thyristor 19. AND gates 82 to 84 apply flash illumination level selecting signals or aperture value selecting signals from the comparators 73 to 75 to the latch circuits 85 to 87. The output terminal of gate 82 is connected to the gate of a thyristor forming the latch circuit 85. The output terminal of gate 83 is connected to the gate of a thyristor forming the latch circuit 86. The output terminal of gate 84 is connected to the gate of a thyristor forming the latch circuit 87. Latch circuits 85 to 87 are formed by the respective thyristors. The anode of the thyristor forming the latch circuit 85 is connected through the switches 140a and 140b to the output terminal of the comparator 51 and its cathode is connected through a resistor 110 to the base of a transistor 113. The anode of the thyristor forming the latch circuit 86 is connected through the switches 140a and 140b to the output terminal of the comparator 51 and its cathode is connected through an OR gate 88, an AND gate 160 and a resistor 111 to the base of a transistor 114. The anode of the thyristor forming the latch circuit 87 is connected through the switches 140a and 140b to the output terminal of the comparator 51 and its cathode is connected to the OR gate 89. Inverters 90 to 93 and LEDs 105 to 107 connected to AND gates 94 to 96 display the selected flash light illumination level, in other words, the aperture value before the main firing. Inverter 108 is connected to AND gates 109 and 160. Base resistors 110 to 112 are connected to the npn transistors 113 to 115. Resistors 116 to 118 generate a voltage whose magnitude corresponds to the selected aperture value. Element 119 is a resistor. Resistor 120 is connected in parallel to each of the resistors 116 to 118 to form a voltage dividing circuit. Element 121 is a buffer circuit. Comparator 122 discriminates whether or not the signal supplied from the camera represents the full open F-number of the lens. Resistors 125 and 126 form a voltage dividing circuit for supplying a reference voltage to the negative input terminal of the comparator 122. Resistor 124 is connected between the output of operational amplifier 123 and a junction of the negative input terminal thereof and an outlet "b" at which is signal representative of the aperture value appears and is given off to the camera. Inverter 127 is connected between a synchronizing terminal "c" receptive of the firing trigger signal and an input of an AND gate 132. Monostable multivibrator 131 (hereinafter called one-shot circuit) is connected to an OR gate 80. Elements 97 and 98 are AND gates. LED 104 is connected through a current limiting resistor 100 to an OR gate to warn for an under-exposure. Terminal "a" is supplied a constant voltage from the camera when the release button of the camera is pushed down to a first position in its stroke. A shutter speed changeover signal emerges from terminal "a" and goes to the camera when the charging of the main storage capacitor 39 has been completed. Terminal "b" is the terminal from which the voltage signal corresponding to the selected aperture value is transmitted to the camera and to which the signal representing the full open aperture value of the used objective lens is transmitted from the camera, synchronizing contact "c"

is well known in the art. Terminal "d" is a circuit earth terminal.

In the following description it is assumed that the photographic lens attached to the camera is so fast that the output of comparator 122 is low (L) level, the output of AND gate 98 is also L level, and the output of inverter 108 is high (H) level.

After the auto-strobe of FIG. 4 has been slipped on the hot shoe of the camera, when the battery switch 32 is closed, DC—DC converter 33 and constant voltage source 24 start to operate, charging the main and auxiliary storage capacitors 39 and 36. When the voltage on the main capacitor 39 then reaches a predetermined level, the output of comparator 50 changes from L to H level, thereby lighting LED 53 and informing the photographer of the fact that the main capacitor 39 is fully charged. The high level output is also applied to the base of transistor 41, thereby rendering transistor 41 conductive.

When the photographer then depresses the shutter release button (not shown) to a first position (at this position, the release operation of the shutter and the aperture adjusting operation of the photographic lens are not yet initiated, but only operations of the light metering circuit and display circuit in the camera are initiated), the hot shoe of the camera gives off a constant voltage which is then applied to the terminal "a". Because the transistor 41 is in a conducting state, this voltage is fed back to switch the shutter time control circuit from the daylight exposure mode to the flash exposure mode. Also, because that constant voltage is, at the same time, applied through the buffer circuit 54 to comparator 51 at the positive input terminal (+), the output of comparator 51 changes from L to H level. Now assuming that the head 3 of FIG. 1 is located at any of the discrete positions where the brushes are in contact with the teeth of FIGS. 2 and 3, then switches 140a and 140b are the ONE state and the H level output from comparator 51 is applied therethrough to the anodes of latch circuits 85 to 87. The output of AND gate 128 also changes from L to H level.

This change in the output of AND gate 128 causes one-shot circuit 130 to produce an H level output voltage for a predetermined period of about several tens of [μg]. Responsive to this, trigger circuit 38 produces a trigger pulse for the auxiliary discharge tube 37. Since, at this time, the auxiliary capacitor 36 has a sufficiently high voltage, the trigger pulse fires the auxiliary discharge tube with the supply of electrical current from the capacitor 36. Thus, a preliminary flash lighting is initiated.

The pulse from one-shot circuit 130 is also applied to AND gates 82 to 84 and OR gate 80. Therefore, AND gates 82 to 84 are gated on, and transistor 68 is rendered non-conductive to release the range finding capacitor 57 from short-circuiting and to allow the light metering circuit 23, 57, which now serves as the range finder, to start to operate. Up to this time, the synchronizing contact "c" is not given the L level firing trigger signal. Therefore, transistors 62 to 64 are all in a non-conductive state, setting the flash illumination dependent timing capacitors 58 to 60 in inoperative positions.

From the start of the preliminary firing onward, as the reflection of the flash light from the object is being received by the photo-transistor 23, the voltage stored on the capacitor 57 increases with time. In several tens of [μg] from the start of the preliminary firing, the output of one-shot circuit 130 becomes low. The concurrent voltage on the capacitor 57 is thereby latched as range information on the latch circuits 85 to 87 in the following way.

When the object distance is very long, the brightness level of the object from the preliminary flash illumination is so low that the voltage stored on the capacitor 57 can only change the output of the comparator 75 to the H level. In this case, only the latch circuit 87 changes its output to the H level. Responsive to this, OR gate 89 and AND gate 109 successively change their outputs to the H level, thereby only rendering transistor 115 conductive to bring the resistor 118 into parallel connection with resistor 120. The potential at the positive input of buffer circuit 121 is then dropped by a magnitude depending on the resistance value of resistor 118, and the potential at the non-inversion input of amplifier 123 is also correspondingly dropped. As a result, a voltage proportional in magnitude to the resistance value of resistor 118 appears at terminal "b". If the resistance value of resistor 118 is previously adjusted in conformance with an aperture value, for example, F/2.0, the voltage at terminal "b" serves as a signal representing that the selected aperture value is F/2.0.

Meanwhile, change of OR gate 89 to the H level make AND gate 78 ready for producing an output of H level and therefore transistor 64 ready for conducting. This means that of the time constant circuits in the firing period control circuit of the auto-strobe, the third time constant circuit responsible for F/2.0 is selected to operate.

Change of the output of OR gate 89 to the H level also causes change of the output of AND gate 128 to the H level, which in turn causes change of the output of AND gate 96 to the H level because the output of latch circuit 86 is L level. Thus, LED 105 is lit, informing the photographer that after the shutter button reaches its second position, the aperture opening of the diaphragm in the photographic lens of the camera will be adjusted to F/2.0 and the critical level on which the firing period depends will be adjusted in conformance with that aperture value or F/2.0.

Alternately, assuming that the voltage stored on capacitor 57 changes the outputs of comparators 75 and 74 to the H level, then the output of latch circuits 86 and 87 become H level and are applied through OR gates 88 and 89 to change the outputs of AND gates 160 and 109 to the H level, thereby rendering transistors 114 and 115 conductive to bring each aperture setting resistors 117 and 118 into parallel connection with resistor 120. The potential at the positive input terminal of buffer circuit 121 is then dropped by a magnitude depending on the combined resistance value of resistors 117 and 118 (for example, corresponding to F/4.0) and the potential at the non-inversion input terminal of amplifier 123 is also correspondingly dropped.

As a result, terminal "b" is fed to a voltage of such value to close down the diaphragm of the camera to a smaller value than the aforesaid F/2.0, in this instance, to F/4.0.

Such change of the outputs of OR gates 88 and 89 also causes transistors 63 and 64 to be ready to become conductive because one of the two inputs of each AND gate 77 and 78 become an H level. That is, of the time constant circuits of the auto-strobe, the third and second time constant circuits, which in combination correspond to the aforesaid aperture value F/4.0, are selected to operate.

Changes of the outputs of OR gates 88 and 89 to the H level also makes the output of AND gate 128 the H level, which in turn causes only one of AND gates 94 to 96, or the gate 95, to change its output to the H level, since the output of latch circuit 85 is L level. LED 106 is thus lit, informing the photographer that the aperture opening of the photographic lens of the camera and the critical level on which adjustment of the firing period depends will be adjusted to the above identified aperture value F/4.0.

Alternately, assuming that the voltage stored on capacitor 57 changes the outputs of comparators 75, 74 and 73 to the H level, then all latch circuits 85 to 87 change their outputs to the H level, which in turn cause OR gates 88 and 89 and AND gates 109 and 160 to change their outputs to the H level. Therefore, transistors 113 to 115 are rendered conductive and bring each aperture setting resistor 116 to 118 into parallel connection with resistor 120. The potential at the positive input terminal of buffer circuit 121 is thereby dropped to a level representative of, for example, F/8.0, and the potential at the non-inversion input terminal of amplifier 123 is also dropped to a corresponding level.

As a result, terminal "b" carries a voltage of a value such as to close down the diaphragm of the lens of the camera to an aperture value smaller than the aforesaid case, that is, to F/8.0.

When the output of latch circuit 85 becomes H, and all the outputs of OR gates 88 and 89 become H, one of the inputs of each of the AND gates 76, 77 and 78 becomes H level and transistors 62 to 64 become ready for conducting. That is, the first to third time constant circuits are selected to operate, giving the above-identified aperture value F/8.0.

Change of the output of latch circuit 85 to the H level also causes only LED 107 to light. This informs the photographer that the aperture opening of the lens and the critical level on which adjustment of the firing period depends will be adjusted to F/8.0.

Suppose the object is so far away that within the period of about several tens of [μg] determined by the output of one-shot circuit 130, one of the comparators 73 to 75 changes its output to the H level. Transistor 113 stays non-conductive because the output of latch circuit 85 is an L level. At this time, the outputs of AND gates 160 and 109 are L because the outputs of latch circuits 86 and 87 are L. With the object at such a far distance, therefore, any of the transistors 113 to 115 specifying three definite aperture values for the photographic lens (not shown) is held non-conductive, so that the amplifier 12 produces a voltage whose magnitude is determined by the ratio of the resistance value of resistors 119 and 120 and which represents, for example, F/1.0 to a diaphragm control circuit (not shown) in the camera through terminal "b". At this time, the output of latch circuit 87 is L as mentioned above. Therefore, the output of AND gate 97 is H and LED 104 is lit. This informs the photographer that even with the flash illumination, an under-exposure will result. Further, because the outputs of OR gates 88 and 89 and latch circuit 85 are L level and therefore because the outputs of AND gates 76, 77 and 78 also are L level, transistors 62, 63 and 64 are in the OFF state, so that the condenser capacitance of the integrator circuit is only determined by capacitor 57. Since the capacitance of capacitor 57 is taken at a value corresponding to the prevailing full open aperture value, the flash's lighting condition is also set in conformance with the aperture value during flash photography.

The preliminary firing operates in the manner described above. After the photographer makes sure the preliminary firing operation has been terminated, that is, the operation of selecting one of the three apertures values and one of the three critical levels for adjustment of the firing period has been terminated, he may further depress the release button a second stroke. The aperture opening of the diaphragm is then adjusted to the selected aperture value by the signal supplied from the terminal "b". The shutter is then opened to initate an exposure. When the shutter opens fully, a synchronizing switch is turned on, a synchronizing signal is passed through terminal "c" to the flash unit. This signal is applied to the inverter 127. The output of inverter 127 is H level and is applied as an H level synchronizing signal to AND gate 132. The AND gate 132 then produces an H level. Therefore, one-shot circuit 131 operates, the pulse from the one-shot circuit 131 is applied to trigger circuit 10 to turn on thyristor 18, main flash tube 13 is triggered to fire, and main lighting is carried out by the main discharge tube. The pulse of the one-shot circuit 131 is also applied through OR gate 80 and inverter 79 to the base of transistor 68, thereby turning off transistor 68. The time constant circuit or circuits selected by the above described preliminary lighting then starts or start to integrate the reflection of the main flash light from the object. When the amount of flash light integrated reaches the predetermined level, comparator 73 changes its output to the H level. This output is applied through AND gate 81 to thyristor 19, thereby turning thyristor 19 on to stop firing of the main flash tube. The exposure time is also adjusted to the flash exposure value by the circuit in the camera. After this time, the shutter is closed to terminate the exposure.

It should be pointed out here that as the aperture for flash exposure and the aperture dependent factor for the firing period control circuit are automatically evaluated and set in the preliminary firing step, the correct flash exposure is made assuming that the head 3 is left unchanged from its angled position for the preliminary firing. If the head 3 is unintentionally moved from that position and the photographer is unaware of this accident before the second stroke is operated, no proper flash exposure will be made, because the aperture value and the flash factor selected by the preliminary lighting no longer coincide with those after the head has moved.

For this reason, in the present invention, after the preliminary firing, it is examined whether or not the head is later moved. If it is detected that the head has changed its position from the one for the preliminary firing, the flash unit warns the photographer of this as will now be described. When the preliminary firing is followed by a changed of the position of head 3, the brushes 7 and 9 of FIGS. 2 and 3 are taken out of contact with the teeth 6A and 8A at least one time. Therefore, switches 140a and 140b are turned off, the anodes of the latch circuits become L level, and the thyristors constituting the latch circuits are turned OFF. Thus, the latch circuits 85 to 87 cancel the latched state by the preliminary firing as has been described above, and all the latch circuits are forced to take the L level. Therefore, as has been mentioned above, LED 104 is lit, warning the photographer that the head 3 has been accidentally moved.

As has been described above, in the foregoing embodiment, after the preliminary firing, when the head turns, this is detected and the flash unit alerts the photographer. When a bounced flash exposure is to be made by using a flash unit in which the aperture is evaluated by the aforesaid preliminary firing, therefore, an advantageous warning can be displayed.

Though this embodiment has been described in connection with the common use of a single LED for warning of an under-exposure and an accidental movement of the head, a separate LED may be used for warning of the accidental movement of the head. In this case, the output of the AND gate 128 is connected to one input of an additional AND gate the opposite input of which is connected to the switch 140a, and the output of the additional AND gate is connected to a flip-flop, so that the flip-flop is set when its input changes from H to L. The head accident warning LED is energized by the output of the flip-flop.

The warning display may be otherwise presented in the form of a sound, and it is of course good to position the aforesaid luminous LEDs in the finder of the camera so that the warning display is made in the field of view of the finder.

Further, the width of the comb tooth of FIGS. 2(b) and 3(b) may be otherwise made so that the head is allowed to deviate from the right position by a predetermined distance (for example, not more than 5°) without turning the switches 140a and 140b off, as such range of deviation of the head is considered to have substantially negligible influence on the accuracy of flash firing control.

Figure 5:
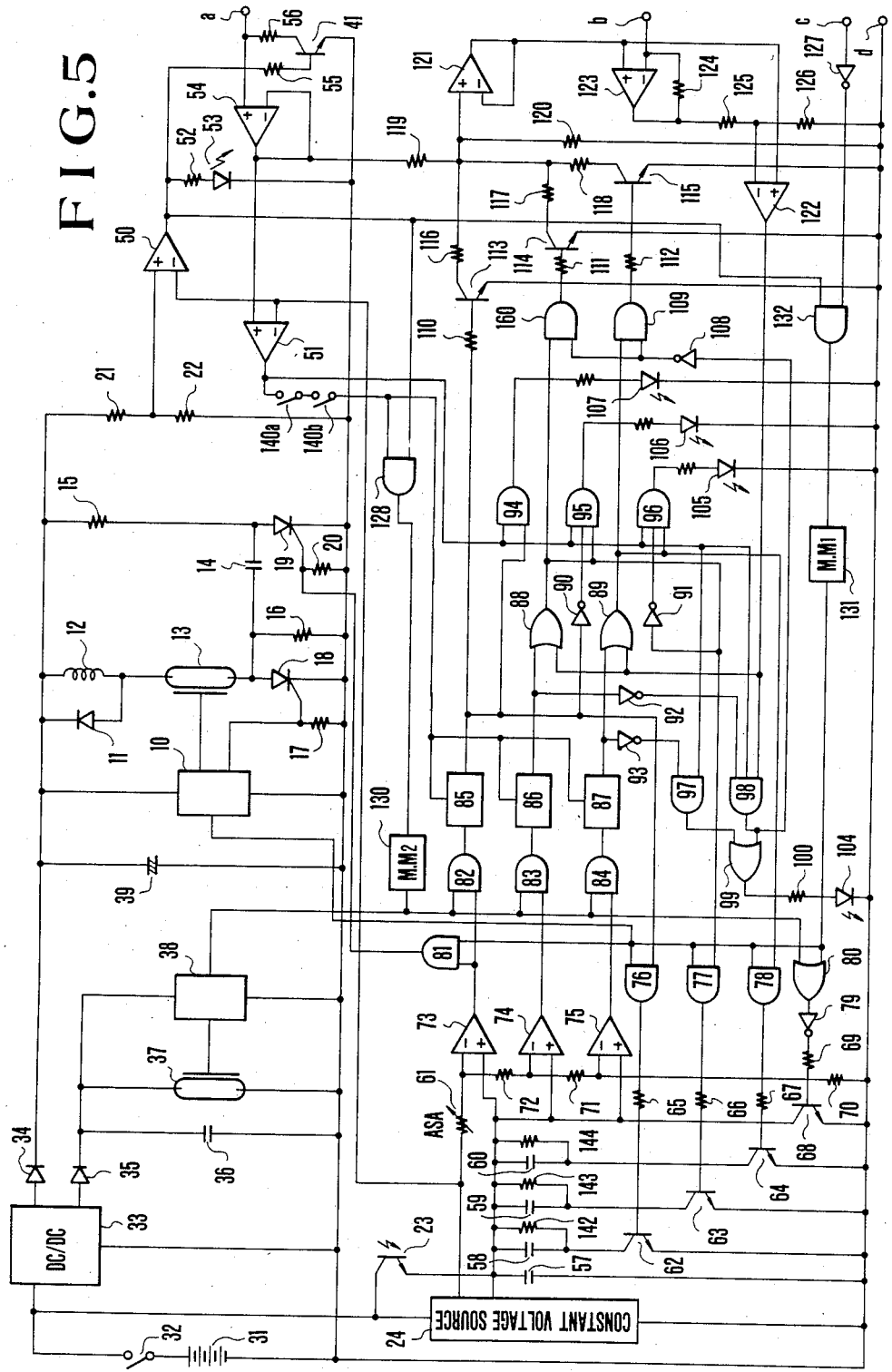
FIG. 5 is similar to FIG. 4 except that another embodiment of the invention is illustrated.

FIG. 5 is an electrical circuit diagram illustrating another embodiment of the flash unit according to the present invention wherein the same reference characters have been employed to denote similar parts to those shown in the embodiment of FIG. 4. This embodiment differs from FIG. 4 in that switches 140a and 140b are connected to the input terminal of AND gate 128, and the output of comparator 51 is applied to AND gates 94 to 96.

The circuit of FIG. 5 operates as follows: After battery switch 32 has been turned on, upon the first stroke of the shutter release, if, at this time, charging of the main capacitor 39 is completed, the circuit operates in a similar manner to that described in connection with FIG. 4 until comparator 51 produces an H level output. Because the output of comparator 51 is applied to AND gate 128 through the switches 140a and 140b, when the head 3 is not in the normal shooting or click-stopped bounce position, AND gate 128 blocks the H level output so that no preliminary firing takes place. When the head is in the normal shooting or click-stopped bounce position, then the switches 140a and 140b are in the ON position, AND gate 128 produces the H level output, and preliminary firing is carried out as mentioned above.

After the preliminary firing, the circuit proceeds to operate in a similar manner to that described in connection with FIG. 4. Thus, the contents of the latch circuits 85 to 87 are determined by the preliminary firing, and the suitable aperture value is selected. When the second stroke of the shutter release is operated, an exposure is initiated with the aperture opening adjusted to that selected value and with the main flash firing. As the sensitivity of the light metering circuit is set in conformance with the selected aperture value, the firing period is adjusted in accordance with the selected aperture value to obtain a proper flash exposure.

With this circuit, when the preliminary firing is followed by an intentional change of the bounce position of the head 3, the brushes 7 and 9 of FIGS. 2 and 3, after having once been taken out of contact with their comb teeth, come again into contact with the teeth, provided that the new position of head 3 is the click-stopped one. Therefore, the switch 140a or 140b moves from the ON to the OFF position. The contents of the latch circuits are cancelled as in the embodiment of FIG. 4, and LED 104 is lit, indicating that the head has turned. Then, as the switch 140a or 140b is turned on again, AND gate 128 produces an H level output. Responsive to this, the one-shot circuit produces a pulse, thereby recycling the above-described preliminary firing operation. The aperture information corresponding to the new position of the head is then given again to the latch circuits. After that, when the second stroke of the camera release button is then operated, the aperture opening is adjusted to the re-selected aperture value, and the period of firing of the main flash tube is adjusted in accordance with the re-selected aperture value.

As described above, in this second embodiment, when the preliminary firing is followed by a change of the lead position, the flash unit lets the photographer know. When the head is newly set again, the preliminary firing operation automatically recycles. Where a bounced flash exposure is made by using a flash unit in which the aperture value to which the diaphragm opening is later adjusted is determined by the preliminary flash illumination, the flash exposure can be controlled correctly through recycled preliminary illumination despite changing of the head position after the initial preliminary illumination.

In this second embodiment, the change in position of the head 3 is directly detected by the switch 140a or 140b, and the LED which indicates an under-exposure also indicates when the head has changed its position. Alternatively, an additional LED or a buzzer may be provided for exclusively indicating that the head has changed its position. This additional LED or buzzer is connected to the switches 140a and 140b so that when the switches 140a and 140b are turned off, the LED or buzzer is energized.

In the described embodiments, the pattern portions are fixed, and the brushes are movable in response to the head. However, this arrangement may be reversed so that the brush is fixed, and the pattern portion is movable as the head turns.

The width of the comb tooth of FIGS. 2(b) and 3(b) may be widened so that even though the head is not as accurately adjusted in position, the switch 140a and 140b remains closed. Therefore, preliminary firing is not recycled for the range of deviation of the head in which the resultant loos in the accuracy of exposure control is substantially negligible.

What we claim:

1. A flash photography apparatus having a main body, in which an exposure factor is determined with a preliminary firing and then a main firing is produced, comprising:
    (a) a head portion changeable in position relative to the main body, said head portion being provided with light emitting means; and
    (b) a detector circuit for detecting the change of position of said head portion, said detector circuit producing a detection signal and including warning means responsive to said detection signal for performing a warning operation when the head portion changes its position after the preliminary firing.

2. A flash photography apparatus having a main body, in which an exposure factor is determined by a preliminary firing and then a main firing is carried out, comprising:
   (a) a head portion changeable in position relative to the main body, said head portion being provided with light emitting means;
   (b) a measuring circuit receptive of the reflection of preliminary firing flash light from an object to be photographed for determining the exposure factor, said measuring circuit having a photosensitive element positioned on the main body; and
   (c) a detector circuit for detecting the change of position of said head portion, said detector circuit producing a detection signal and including warning means responsive to said detection signal for performing a warning operation when the head portion changes its position after the preliminary firing.

3. A flash photography apparatus having a main body in which an exposure factor is determined by a preliminary firing and then a main firing is carried out, comprising:
   (a) a head portion changeable in position relative to the main body, said head portion having light emitting means;
   (b) a detector circuit for detecting a change of position of said head portion relative to the main body;
   (c) a preliminary firing operation control circuit for causing said light emitting means to carry out a preliminary firing; and
   (d) a warning signal forming circuit for receiving an actuating signal from said preliminary firing operation control circuit and a detection signal from said detector circuit and responsive to simultaneous occurrence of actuating and detection signals for causing warning means to perform a warning operation.

4. A flash photography apparatus having a main body, in which an exposure factor is determined by a preliminary firing and then a main firing is carried out comprising:
   (a) a head portion changeable in position relative to the main body, said head portion having light emitting means; and
   (b) a detector circuit for detecting a change of position of said head portion, said detector circuit being responsive to detection of the fact that after the preliminary firing, said head portion has changed position, for producing a detection signal to cause said light emitting means to perform another preliminary firing.

5. A flash photography apparatus having a main body, in which an exposure factor is determined by a preliminary firing and then a main firing is carried out, comprising:
   (a) a head portion changeable in position relative to the main body, said head portion being provided with light emitting means;
   (b) a detector circuit for detecting a change of position of said head portion relative to the main body;
   (c) a preliminary firing operation control circuit for causing said light emitting means to carry out a preliminary firing; and
   (d) a signal forming circuit for receiving an actuating signal from said preliminary firing operation control circuit and a detection signal from said detector circuit and responsive to simultaneous occurrence of the actuating and detection signals for producing a signal for again actuating said preliminary firing operation control circuit.

6. A flash photography apparatus of the type in which an exposure factor is determined with a preliminary flash and then a main flash is produced, comprising:
   (a) illumination determining means for determining the illumination of an object by the main flash, and
   (b) detection means for generating a warning signal to cause warning means to perform a warning operation when the illumination determined by the illumination determining means changes after the preliminary flash is done.

7. A flash photography apparatus of the type in which an exposure factor is determined with a preliminary flash and then a main flash is produced, comprising:
   (a) illumination determining means for determining the illumination of an object by the main flash, and
   (b) a control circuit for performing another preliminary flash when the illumination determined by the illumination determining means changes after the first preliminary flash is done.

* * * * *